United States Patent [19]

Goodwin

[11] Patent Number: 5,054,111
[45] Date of Patent: Oct. 1, 1991

[54] HF DATA COMMUNICATIONS SYSTEM WITH NETWORK MANAGEMENT

[75] Inventor: Robert J. Goodwin, Hants, England

[73] Assignee: Siemens Plessey Electronic Systems Limited, Chessington, England

[21] Appl. No.: 220,213

[22] PCT Filed: Nov. 19, 1987

[86] PCT No.: PCT/GB87/00822

§ 371 Date: Sep. 29, 1988

§ 102(e) Date: Sep. 29, 1988

[87] PCT Pub. No.: WO88/04497

PCT Pub. Date: Jun. 16, 1988

[30] Foreign Application Priority Data

Dec. 2, 1986 [GB] United Kingdom ............... 8628824

[51] Int. Cl.$^5$ ............................................. H04B 1/10
[52] U.S. Cl. ..................................... 455/34; 455/61; 455/67; 455/186; 340/825.5
[58] Field of Search ........................ 455/32, 34, 62, 54, 455/166, 67, 184-186, 51; 370/94.1, 60; 379/59, 60, 63; 340/825.5, 825.57; 315/107, 110, 111

[56] References Cited

U.S. PATENT DOCUMENTS

| | | | |
|---|---|---|---|
| 4,155,040 | 5/1979 | Harmon et al. | 455/34 |
| 4,509,203 | 4/1985 | Yamada | 455/166 |
| 4,534,061 | 8/1985 | Ulig | 455/34 |
| 4,554,677 | 11/1985 | Smith et al. | 455/34 |
| 4,887,267 | 12/1989 | Felix | 455/34 |

OTHER PUBLICATIONS

"Functions and Structure of a Packet Ratio Station", by J. Burchfiel et al., A.F.I.P.S. Conference Proceedings, 1975 National Computer Conf., AFIPS Press, pp. 245-251.

"Distributed Routing and Relay Management in Mobile Packet Radio Networks", by Jane W. S. Liu, Compcon '80, 21st IEEE Computer Society Int'l Conf., 1980, pp. 235-243.

"Packet Distribution System in a Survivable Satellite Network", by Dr. Ricci, ICC '79 Conf. Record, Int'l Conf. on Communications, Boston, MA, 6/79, IEEE, pp. 41.1.1-41.1.5.

Primary Examiner—Curtis Kuntz
Attorney, Agent, or Firm—Fleit, Jacobson, Cohn, Price, Holman & Stern

[57] ABSTRACT

A method of network management for a radio communications network comprising a plurality of stations each of which includes a transceiver and control means therefor, the transceiver and control means of the respective stations being substantially similar, and the stations being arranged to communication directly with any other station, the method comprising: assigning at least one control channel of predetermined frequency to the network for transmitting network control signals between the stations; assigning to each station which may assume control a ranking position in a priority list of stations which may assume control of the network; each station monitoring the control channel or channels to determine whether control has been established by another station, and if so accepting control signals from such other station, and if control has not been established, the station transmits at a time determined by the ranking position of the station control signals on said control channel or channels for assuming network control.

3 Claims, 2 Drawing Sheets

HF DATA COMMUNICATIONS SYSTEM WITH NETWORK MANAGEMENT

This invention relates to a high frequency (HF) communications network comprising a plurality of stations each of which may intercommunicate with any other station.

HF is generally recognized as the frequency range 2-30 MHz. However for the purposes of this specification, this term is intended to cover any frequency up to 30 MHz and may include frequencies above 30 MHz. The term is intended to designate a type of radio transmission usually involving ionospheric reflection, from the F-layer, the maximum usable frequency usually being somewhat less then 30 MHz.

Commercial and military systems are known employing HF transmission between a large number of ground stations located over a limited geographical area, for example, an army may possess portable transceivers carried on vehicles or as "man-packs" which rely on HF data transmissions. In emergency situations, not all transceivers may be in operation and if may be important to know precisely how many stations are operative and establish communication between those operative stations.

In addition whilst HF stations have traditionally required skilled operators, skilled operators are in short supply and proposals have been made to automate certain call establishment procedures so that unskilled operators may operate the transceivers. Thus in IEE Conference Procedings 1985 no. 245, "Real time frequency management in an embedded microcomputer", E.T. Clarke, a microcomputer which is normally present in portable transceivers is employed to store a model of the ionosphere over a limited geographical area so that predictions of usable channel frequencies may be made automatically.

However there has been no previous proposal for an automatic system for establishing network control in a network of stations where the precise number and location of the stations is initially unknown.

It is therefore an object of the present invention to provide in an HF telecommunications network, an automated system for establishing network control which may be operated by unskilled operators.

The present invention provides a method of network management for an HF communications network comprising a plurality of stations each of which includes a transceiver and control means therefor, said transceiver and control means of the respective stations being substantially similar, and the transceivers being arranged to communicate directly with any other station, wherein the system comprises:

assigning at least one control channel of predetermined frequency to the network or transmitting control signals between the stations;

assigning to each station which may assume control a ranking position in a priority list of stations which may assume control of the network;

each station being arranged to monitor the control channel or channels to determine whether control has been established and each station being arranged to transmit at a predetermined time, the time of transmission being predetermined according to the ranking position of the station, control information on the channel or channels for assuming control of the network.

Thus in operation of the invention, when a station wishes to go 'on air', it will monitor the control channels which are of frequencies known to the station to determine whether control signals are being transmitted by a station in control of the network. If the station detects such signals which will be transmitted at regular intervals, say every half-hour, then the station will decode the control information for initialisation and synchronisation information and a list of channel frequencies on which it may attempt data transmission.

If the station wishing to go 'on air' does not detect control signals on the control channels, then the station will at a predetermined time transmit control signals on the control channels for assuming network control. This information will include initialisation and synchronisation information which will be received by other stations lower in the priority list for accepting instructions from the station seeking control. Such station will then undergo a procedure for establishing a list of channel frequencies on which data may be transmitted. This procedure is described more fully in our co-pending application now U.S. Pat. No. 4,980,924. Having established a list of channel frequencies of which communications may take place and a list of stations forming the network, these lists are transmitted on the control channels to the other stations in the network and communications may thereafter take place.

Although the invention is particularly applicable to data communication where data is transmitted in digital form, nevertheless analog voice transmission is envisaged.

In the case of a station which goes 'on-air' after a station has assumed control, if the late entrant has a higher assigned rank than the station in control, this is ignored and the station in control will remain in control.

Thus it may be seen the invention provides the following features:
(i) Establishing control when the availability of particular radio stations is uncertain.
(ii) Providing affiliation for an uncertain number of radio stations during network initialisation and subsequent network operation.
(iii) Distributing network control information regularly and reliably in both normal and disturbed radio propagation conditions.

The invention defines a procedure for selecting a network control device or station (CS) from an ordered list supplied by the user. It further describes how the chosen CS determines which radio stations are available for initial affiliation to the network and how the CS provides late entry facilities for stations which subsequently wish to affiliate to the nerwork. The invention also defines a means for distributing control and engineering data to stations in the network.

The radio network is deployed with the User defined list of possible control stations (CS). The list is arranged according to a ranking order and each possible CS is given a time period in which to initialise the network. The first possible CS in the list is given the first time period, the second possible CS the second time period and so on.

A possible CS will assume control in its time period of the network has not already been initialised by a higher ranking or earlier station in the list (i.e. the higher ranking stations can be assumed to be unavailable).

The network is also deployed with every radio station being programmed with a common set of engineering frequencies. All stations will scan these engineering frequencies listening for transmissions from a CS until affiliation to the network is achieved. The CS will in the first instance use each of these engineering frequencies in turn to send probe transmissions to a small subset of the possible network stations. This set of stations transmit replies in the timeslots defined by the CS probe transmissions on those engineering frequencies on which the probes were received. The CS will assess these replies and choose a preferred subset of engineering frequencies on which to contact the remaining network stations.

The CS next sends a probe transmission on each of the preferred engineering frequencies addressed to all network stations. Those stations which receive these probes will transmit replies to the CS in the timeslots defined by the CS probe transmissions. The CS will collect the replies and list the originating stations as being affiliated to the network.

On completion of the initialisation procedure the CS will distribute engineering data via broadcast transmissions on the same preferred selection of engineering frequencies. The engineering data may include for example:

A list of affiliated stations
Timing data for network synchronisation
Frequency management information
Network control instructions Individual stations within the network will combine the broadcasts of engineering data in order to assemble an error free set of data whenever possible.

During normal network operation the CS will transmit update engineering data at regular intervals according to a known time schedule. For example a schedule which repeats on an hourly basis may be used if disturbed propagation conditions are expected. A proportion of these transmissions will be on a subset of the engineering frequencies so that these may be interceped by stations joining the network as late entrants. Late entrants will transmit affiliation messages to the CS.

Stations already affiliated to the network will be scanning a known set of channels awaiting traffic calls. Thus engineering transmissions will be made on these channels at known times to provide rapid updating facility for these stations.

In all cases the engineering transmissions will be transmitted on more than one frequency so that receiving stations may combine versions received in order to assemble an error-free set of data whenever possible.

A preferred embodiment of the invention will now be described with reference to the accompanying drawings, wherein.

Figure 1:
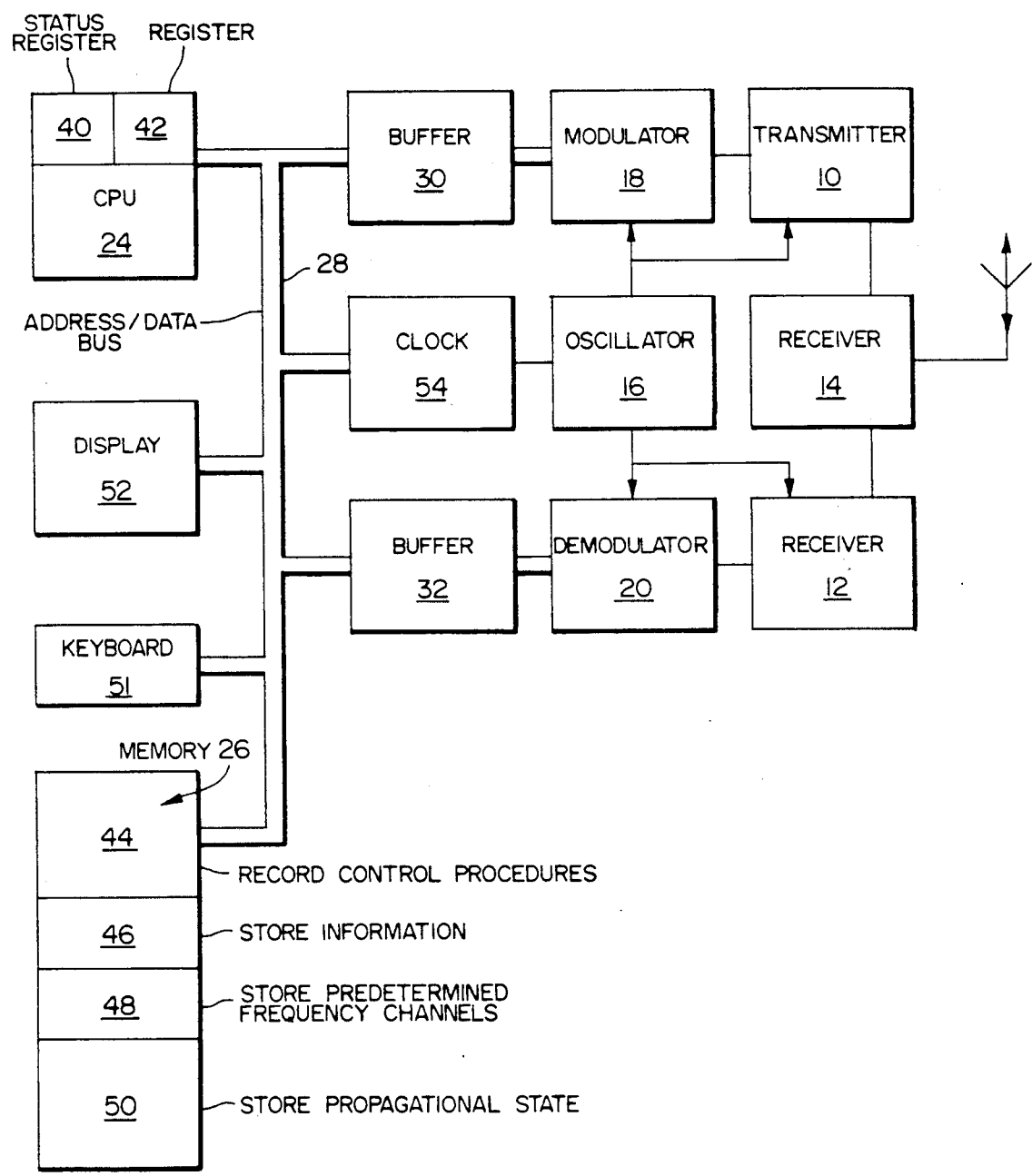
FIG. 1 is a block diagram of a radio station of the HF data telecommunications network according to the invention.

Referring now to FIG. 1 of the drawings, each station of the network includes a transceiver and a control means therefore which are substantially the same. Thus each station comprises a transmitter 10 and a receiver 12 coupled to an HF aerial 14. An oscillator 16 is provided of variable frequency coupled to transmitter 10 and a receiver 14. A microcomputer 22 comprising a central processor 24 and a memory 26 has an address/data bus 28 coupled to a modulator 18 and a demodulator 20 via buffers 30 and 32. The data is fed in digital form from buffer 30 to modulator 18 and modulator 18 is operative to modulate the data onto the carrier frequency by oscillator 16 in any suitable format, e.g. pulse modulation, frequency shift keying or phase shift keying. The data transmission rates are low, $\sim 100$ bauds$^{-1}$ in order to provide for reliable transmission. Encoding techniques are provided for detection and correction of errors and these techniques are described in our co-pending application now U.S. Pat. No. 4,939,737.

Demodulator 20 operates in the opposite manner to modulator 18 to demodulate information from an incoming data stream and to provide this information to buffer 32. Central processor 24 includes a status register 40 for indicating whether the network is under control of another station. The processor includes a further register 42 which stores the location of the station in a priority list in ranking order of stations which may assume control of the network.

Memory 26 is divided into sections of which section 44 is a section recording control procedures, section 46 is a section storing information as to the available frequency channels for information transmission, section 48 is a section for storing predetermined frequency channels for control purposes, and section 50 is a section for storing the propagational state of the ionosphere in digital form and routines for updatiing this information. A keyboard 51 and display 52 are provided and a station clock 54, accurate to wrist-watch accuracy.

Figure 3:
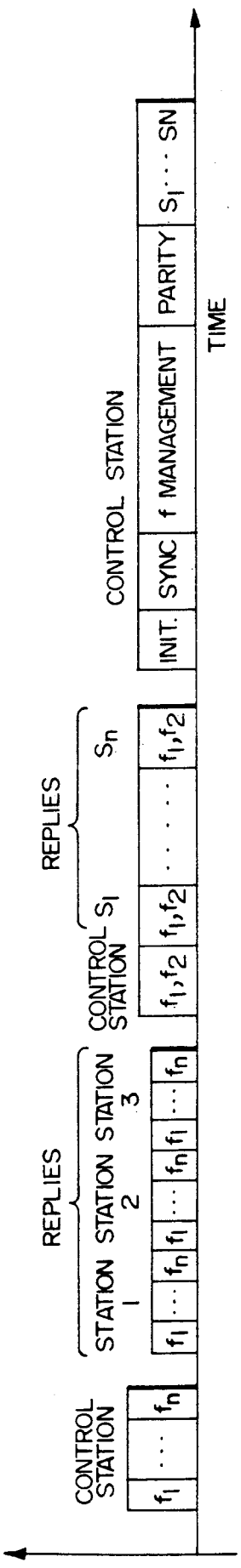
FIG. 3 is a timing diagram showing control signals which are transmitted during a procedure for assuming control by a station; and, FIG. 4 is a timing diagram showing control information which is transmitted during regular intervals to the other stations.

Thus in operation say upon initial start up of the system, an unskilled operator will switch on the system via a keyboard 51 and a display 52 will indicate to the operator the various operations to be performed to start up the station. The receiver 12 will monitor the predetermined control channels for control signals which may be provided by a control station already in operation. If the receiver 12 deletes control signals then these are decoded and interpreted by central processor 24 which thereupon flags status register 40 to indicate that a control station is functioning and that the station should accept control information. Thus the station operates in a slave mode and received information as indicated in FIG. 3. This information includes synchronisation information for synchronising station clock 54 and information which defines the usable 'pool' of frequency channels for data transmission. Following the transmission of control information, there follows a series of time slots in which stations which have received the control information will transmit acknowledgement signals.

Figure 2:
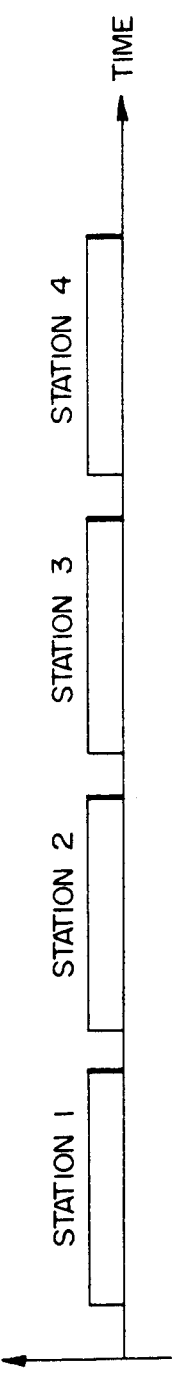
FIG. 2 is a timing diagram showing assigned time slots for transmission to determine the control of the network.

If however upon initial switch on of the system, the station does not detect within a predetermined period any control information transmitted over a control channel, then the station will assume that no control station is in operation and will accordingly initiate a control capture routine in which the address stored in register 42 is monitored and according to the ranking order of the station the station will transmit at a predetermined time as determined by clock 54 and within a predetermined time slot as indicated in FIG. 2 control signals over a control channel which will serve to initialise and synchronise other stations as subservient to the control station.

The transmission sequence is shown in FIG. 3. Initially the control station transmits probe signals over a set of calling channel frequencies $f_i \ldots f_n$ to a subset of test stations 1, 2, 3 and replies are received in predetermined time slots over the channel frequencies. Depending on the replies received, the control station chooses a set of preferred channel frequencies $f_1$, $f_2$ and transmits a further set of probe signals on these channels to all stations. The stations which are operative will reply in time slots Sl . . . SN on frequencies $f_1$, $f_2$. The control station will then draw up a list of stations forming part of the network and distributes on a selected channel frequency control information, comprising initialisation, synchronisation, frequency management information. Replies are received from the station in time slots Sl . . . SN.

Once having assumed control, the radio station undergoes an automatic procedure as is fully described in our copending application now U.S. Pat. No. 4,980,924 for determining a list of channel frequencies in which data transmission can reliably be made.

Figure 4:
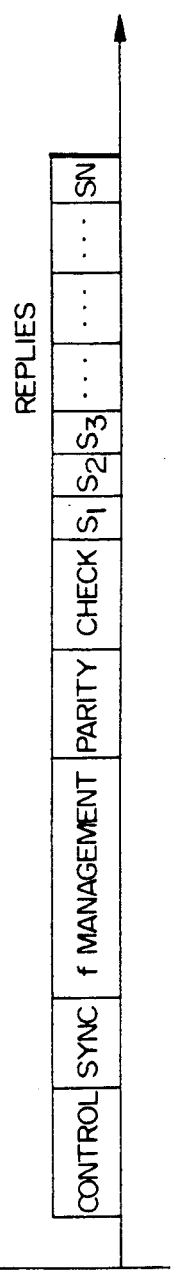

Once having assumed control the control station regularly transmits information on each selected control channel in turn as shown in FIG. 4 comprising packets containing, control, sync frequency management and parity check, and replies are made in time slots Sl . . . Sn

I claim:

1. A method of network management for a radio communications network comprising a plurality of stations each of which includes a transceiver and control means therefor, the transceiver and control means of the stations of the network being substantially similar, and the stations being arranged to communicate directly with any other station, the method comprising:

assigning at least one control channel of predetermined frequency to the network for transmitting network control signals between the stations;

assigning to each station which may assume control a ranking position in a priority list of stations which may assume control of the network;

each station monitoring the control channel or channels to determine whether control has been established by another station, and if so accepting control signals from such other station, and if control has not been established, the station transmits at a time determined by the ranking position of the station control signals on said control channel or channels for assuming network control;

wherein said control signals include initialization and synchronization information and information as the to channel frequencies which may be used for communications;

and wherein each forming part of the network transmits an acknowledgement signal in a predetermined time slot in response to receipt of a control signal;

and wherein when a station seeks network control, a first control signal sequence is transmitted and replies are awaited from a predetermined subset of stations, and if these replies are satisfactory, a second control signal sequence is transmitted to all stations and replies are awaited for defining those stations which are affiliated to the network, and engineering data is then transmitted to all affiliated stations including a list of affiliated stations, timing data and channel frequency information for information transmission.

2. A method as claimed in claim 1, wherein the network is a data communications network for operation in the frequency range of 2-30 mhz.

3. A method as claimed in claim 1 wherein when said control signals are transmitted by the control station at regular intervals on each of the control channels in turn.

* * * * *